United States Patent
Schmidt et al.

(10) Patent No.: US 6,785,459 B2
(45) Date of Patent: Aug. 31, 2004

(54) CABLE MANAGEMENT BRACKETS AND CABINET

(75) Inventors: John David Schmidt, Shakopee, MN (US); Craig Michael Standish, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 212 days.

(21) Appl. No.: 09/892,210

(22) Filed: Jun. 26, 2001

(65) Prior Publication Data

US 2002/0197045 A1 Dec. 26, 2002

(51) Int. Cl.[7] ................................................. G02B 6/00
(52) U.S. Cl. ........................................ 385/134; 211/26
(58) Field of Search ................................. 185/134, 135; 211/26

(56) References Cited

U.S. PATENT DOCUMENTS

| | | | |
|---|---|---|---|
| 1,862,571 A | | 6/1932 | Goff |
| 2,896,009 A | | 7/1959 | Caveney |
| 3,024,301 A | | 3/1962 | Walch |
| 3,321,571 A | | 5/1967 | Lynch |
| 4,818,054 A | * | 4/1989 | George et al. ............... 385/135 |
| 5,402,515 A | | 3/1995 | Vidacovich et al. |
| 5,640,482 A | | 6/1997 | Barry et al. |
| 5,715,348 A | | 2/1998 | Falkenberg et al. |
| 5,758,002 A | | 5/1998 | Walters |
| 6,021,909 A | * | 2/2000 | Tang et al. .................. 211/183 |
| 6,044,194 A | * | 3/2000 | Meyerhoefer ............... 385/134 |
| 6,102,214 A | * | 8/2000 | Mendoza ...................... 211/26 |
| 6,170,784 B1 | * | 1/2001 | MacDonald et al. .......... 248/65 |
| 6,338,413 B1 | * | 1/2002 | Walter et al. ................. 211/26 |
| D463,253 S | * | 9/2002 | Canty .......................... D8/356 |
| 6,468,112 B1 | * | 10/2002 | Follingstad et al. ......... 439/719 |
| 6,489,565 B1 | * | 12/2002 | Krietzman et al. .......... 174/101 |
| 6,501,899 B1 | * | 12/2002 | Marrs et al. ................. 385/135 |
| 2002/0092127 A1 | * | 7/2002 | Nhep ........................... 16/232 |
| 2002/0149923 A1 | * | 10/2002 | Witty et al. .................. 361/828 |

FOREIGN PATENT DOCUMENTS

| | | |
|---|---|---|
| DE | 27 54 558 | 11/1978 |
| EP | 0 491 245 A1 | 6/1992 |
| EP | 0 493 740 A1 | 7/1992 |
| WO | WO 91/15086 | 10/1991 |

OTHER PUBLICATIONS

ADC Telecommunications, Inc. catalog entitled "DSX-1 Digital Signal Cross-Connect," 29 pages, dated May 1998.
ADC Telecommunications, Inc. catalog entitled "Mini DSX-3 Products," 38 pages, dated Jun. 1997.
ADC Telecommunications, Inc. catalog entitled "FL2000 Products," 57 pages, dated Nov. 1996.
ADC Telecommunications, Inc. catalog entitled "Fiber Panel Products," Second Edition 117 pages, dated Jul. 1996.

(List continued on next page.)

*Primary Examiner*—Hae Moon Hyeon
(74) *Attorney, Agent, or Firm*—Merchant & Gould P.C.

(57) ABSTRACT

A cable management cabinet assembly for telecommunications equipment. The assembly includes a cabinet frame with sidewalls and vertical support members. A cable management bracket having an elongated member is fastened to the support members. A plurality of fingers project outwardly from the elongated member. The fingers are spaced apart along the length of the elongated member. Gaps sized to receive telecommunications cables are positioned between the fingers. Bend radius limiters are preferably connected to the fingers to prevent cables passing through the gaps from being bent beyond predetermined bend radius requirements. The bracket defines a vertical cable pathway between the side walls and the fingers for guiding cables within the cabinet.

8 Claims, 22 Drawing Sheets

OTHER PUBLICATIONS

ADC Telecommunications, Inc. catalog entitled Secure Fiber Entrance Terminal (SFET), 8 pages, dated May 1998.

ADC Telecommunications, Inc. catalog entitled "Fiber Entrance Cabinet," 12 pages, dated Jul. 1998.

ADC Telecommunications, Inc. catalog entitled "Fiber Cable Management Products," 142 pages, dated Jun. 1998.

ADC Telecommunications, Inc. catalog entitled "Fiber Outside Plant Systems," 12 pages, dated Aug. 1998.

ADC Telecommunications, Inc. catalog entitled "ACE–100 and 200DS Above Ground Enclosure," 16 pages, dated Aug. 1998.

ADC Telecommunications, Inc. catalog entitled "Next Generation Frame (NGF) Product Family Ordering Guide," 24 pages, dated Oct. 1998.

ADC Telecommunications, Inc. catalog entitled "Value–Added Module System," 36 pages, dated Jun. 1998.

Drawing of ADC Telecommunications, Inc., commerical product, one sheet (undated).

ADC Telecommunications, Inc. catalog entitled "Fiber Cable Management Products, Second Edition," front cover, back cover, and pages 2–21, 91, 104 and 105, dated Oct. 1995.

ADC Telecommunications, Inc. catalog entitled "Digital Signal Cross–Connect (DSX–3) Front and Rear Cross–Connect Products," front cover, back cover, and pp. 26, 27 , 42, and 44, dated Jul. 1996.

Panduit Corp. catalog entitled "Communication Products," fron cover, back cover, and pp. 59, 60, 61, 71, and 72, dated 1996.

Middle Atlantic Products, Inc. catalog entitled "Rackmount Solutions," front cover, back cover, and p. 26, dated Apr. 1998.

Photographs of a cable management product by Panduit Corp.

ADC Telecommunications, Inc. catalog entitled "Broad-Wire™ 528–Port 23Inch Central Office ADSL Splitter Chassis Installation Guide," 17 pages, dated Aug. 2000.

ADC Telecommunications, Inc. catalog entitled "Enteraprise™ Structured Connectivity Systems Glide Cable Management System" 12 pages, dated Nov. 2000.

* cited by examiner

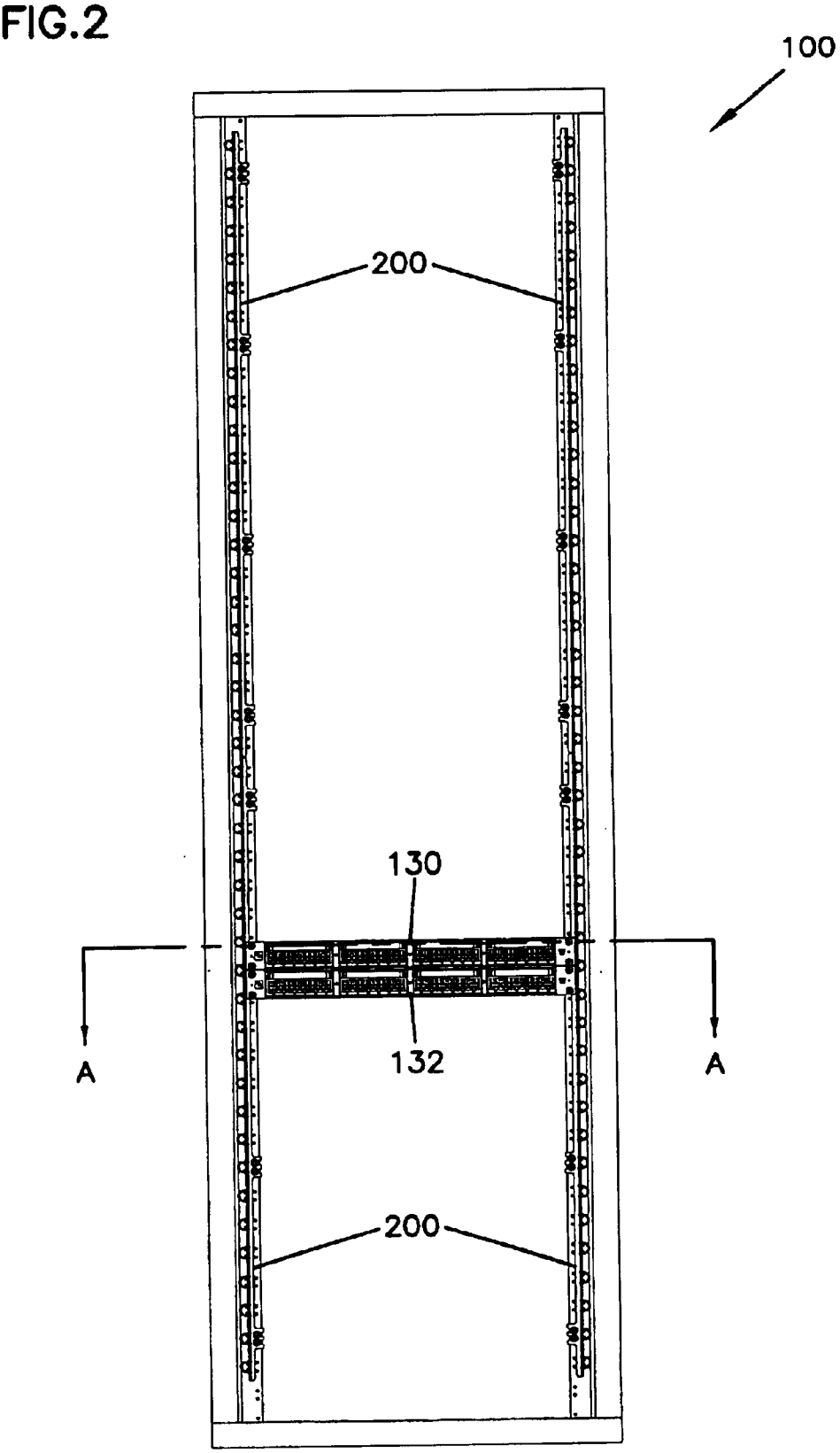

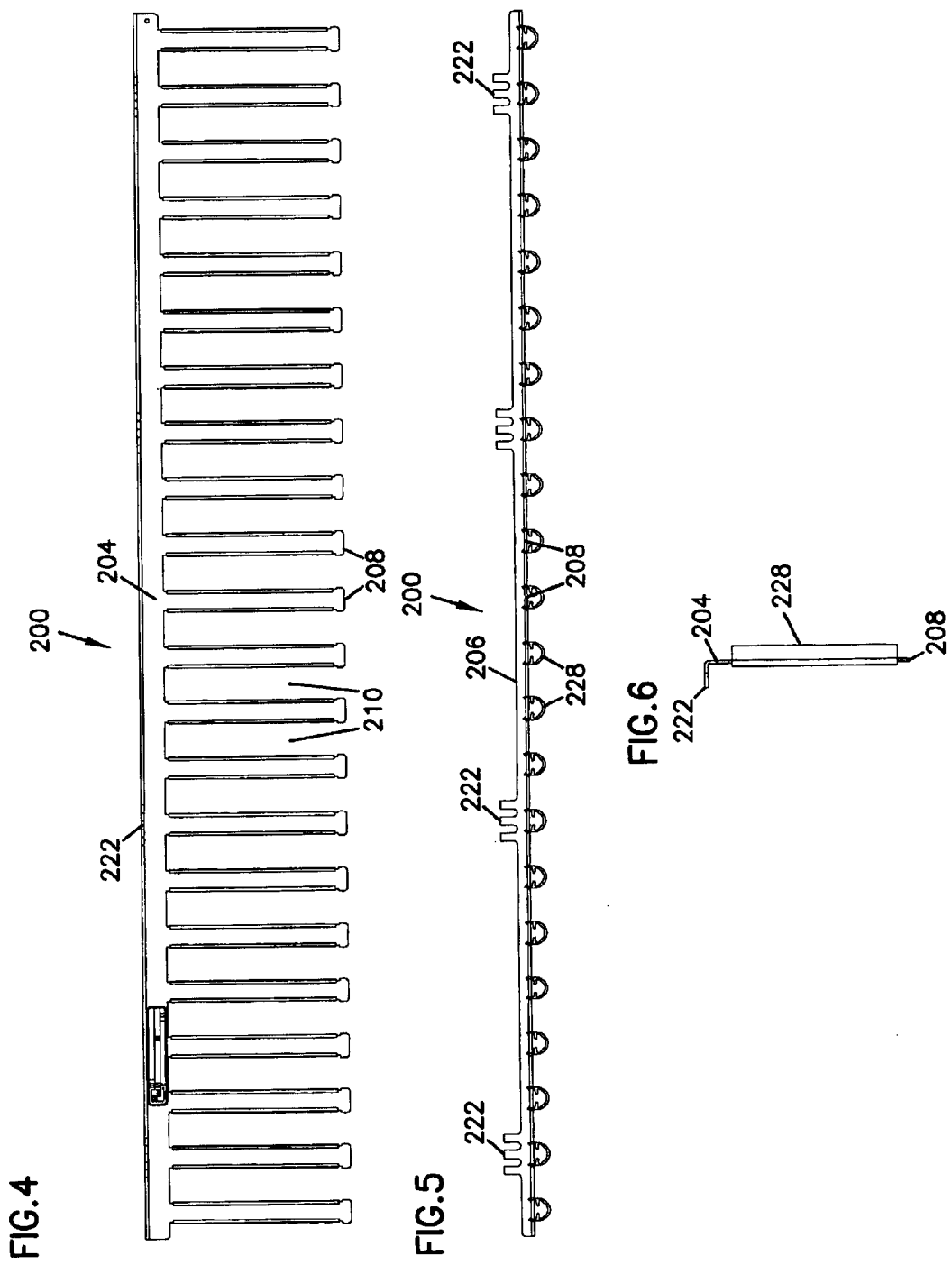

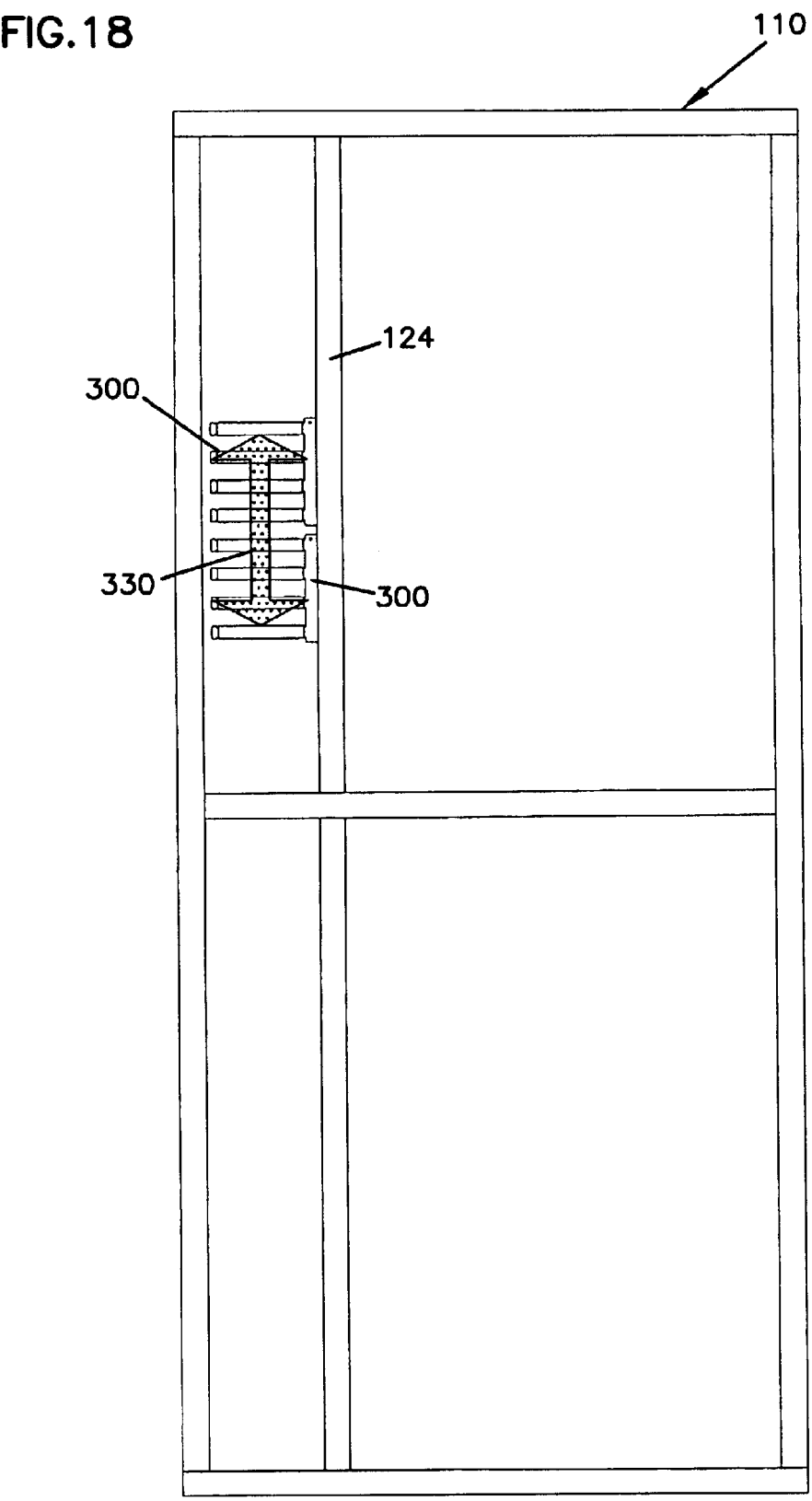

CABLE MANAGEMENT BRACKETS AND CABINET

FIELD OF THE INVENTION

The present invention relates generally to devices for enhancing cable management in a telecommunications system. More particularly, the present invention relates to cable management brackets for use in telecommunications systems.

BACKGROUND OF THE INVENTION

Telecommunications systems commonly include cables (e.g., fiber optic cables or copper twisted pair cables) for interconnecting pieces of telecommunications equipment. Suppliers and users of structured connectivity communications systems in local area networks often have difficulty managing the cabling and demarcation and patching points such as in communications closets and computer rooms. Here, large numbers of data, voice, and video communications circuits, cables and connectors may be concentrated into small areas on relay racks and in communications cabinets resulting in congestion of cabling and connectors.

Because of the large number of cables present at a location such as a communications room, cable management is crucial. Cable management involves efficiently routing cables to minimize the space occupied by such cables. Cable management also involves routing cables in an orderly manner so as to reduce the likelihood of "spaghetti" (i.e., tangling of cables). Ease of cabling is also a factor related to effective cable management.

In routing cables, it is also desirable to prevent cables from being excessively bent. This is particularly true for fiber optic cables as well as copper cables adapted for transmitting data (i.e., Category 5, 5e and 6 cables). If such cables are bent beyond certain predefined radius limits, signal degradation and cable damage can possibly occur.

SUMMARY OF THE INVENTION

One aspect of the present invention relates to a cable management bracket for use in a telecommunications cabinet. The bracket includes an elongated member and a plurality of fingers projecting outwardly from the elongated member. The fingers are spaced apart along the length of the elongated member. Gaps sized to receive telecommunications cables are defined between the fingers. Bend radius limiter portions are preferably provided on the fingers to prevent cables passing through the gaps from being excessively bent.

Another aspect of the present invention relates to a cable management cabinet assembly. The cabinet assembly includes a frame defining a front, back, top, and opposed sides of the frame. Side walls may be fastened to the opposed sides of the frame to define a frame interior. Coupled to the frame are two vertical support members which define a plurality of fastener holes for mounting telecommunications equipment to the cabinet. The cabinet assembly includes a bracket having an elongated member with a plurality of fingers that project outwardly from the elongated member. The bracket is fastened directly or indirectly to a vertical support member. The fingers are spaced apart to define a plurality of gaps along the length of the elongated member in the vertical direction. The gaps are sized to receive cables connected to the piece of telecommunications equipment. The fingers are spaced from the side walls of the cabinet frame to create a vertical cable pathway between the fingers and the side walls. The fingers include bend radius limiter portions for preventing the cables from being damaged.

Still another aspect of the present invention relates to a method of retrofitting cable management brackets onto preexisting cable cabinets having equipment already mounted thereto. The method includes the steps of loosening the fasteners which mount the equipment to the cabinet and sliding the brackets laterally behind the fasteners and then retightening the fasteners.

A further method relates to adding panels to a cabinet where a fastener is removed from a hole holding a cable management bracket to the cabinet, without removing the bracket from the cabinet, then mounting the panel to the cabinet through the same hole using a fastener where a portion of the bracket is positioned between the panel and the cabinet.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE INVENTION

FIG. 2 is a front view of the cable management cabinet assembly of FIG.

FIG. 4 is side view of the bracket of FIG. 3.

FIG. 5 is a front view of the bracket of FIG. 3.

FIG. 6 is a top view of the bracket of FIG. 3.

FIG. 18 is a side view of the cabinet of FIG. 17 with side walls removed to show the cable management brackets.

Figure 1:
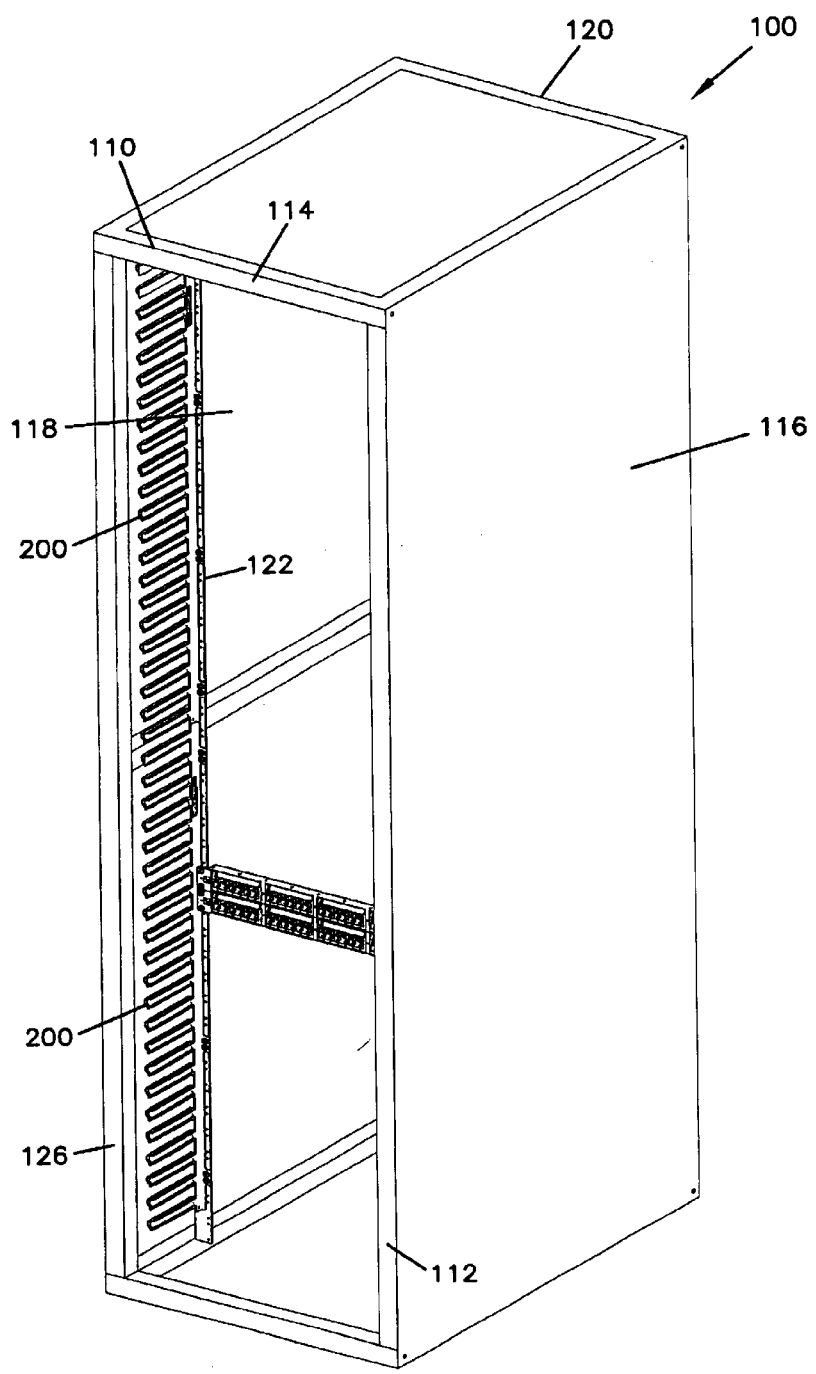
FIG. 1 is a front perspective view of a first cable management cabinet assembly according to the present invention.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention.

Referring now to FIGS. 1 and 2, the FIGS. show a telecommunications cabinet assembly 100 constructed according to the present invention. The cabinet assembly 100 includes a cabinet frame 110 having vertical and horizontal support beams 112 and 114. Side walls 116 and 118 and top 120 are fastened to the cabinet frame to define a frame interior.

Figure 1A:
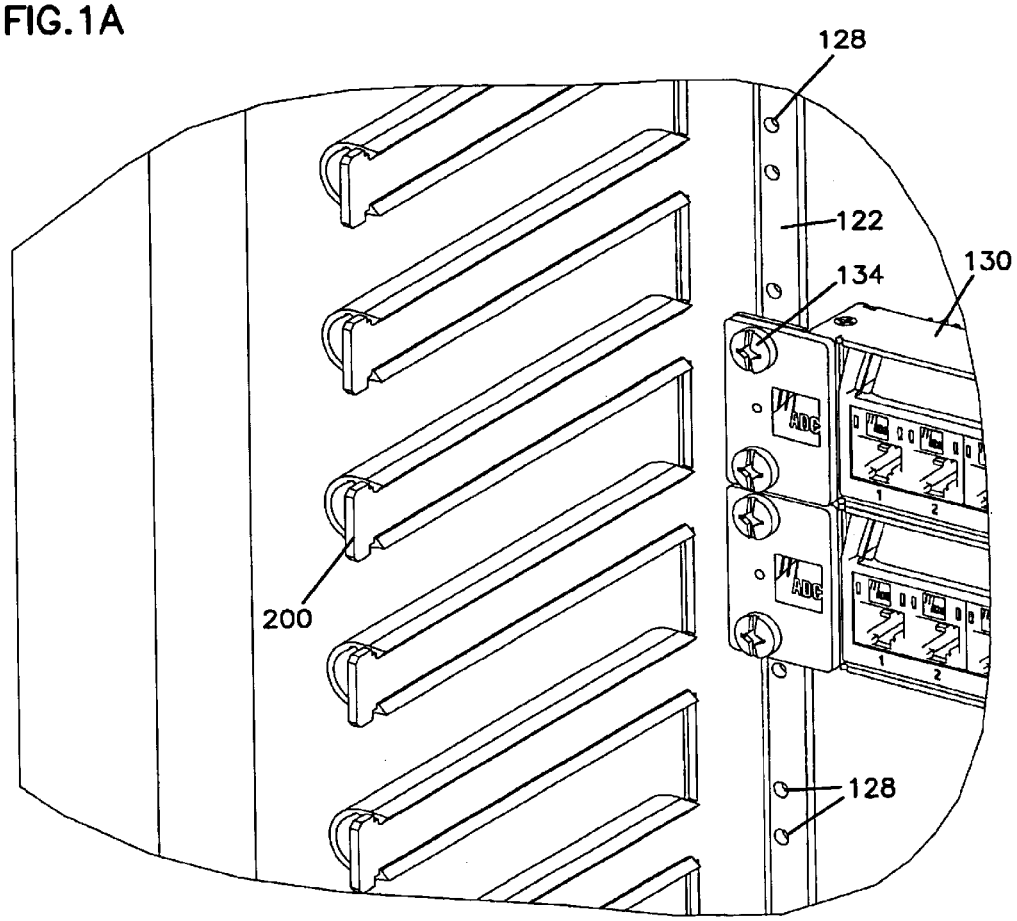
FIG. 1A is a detailed view of a portion of the cable management cabinet assembly shown in FIG. 1.
Figure 2A:
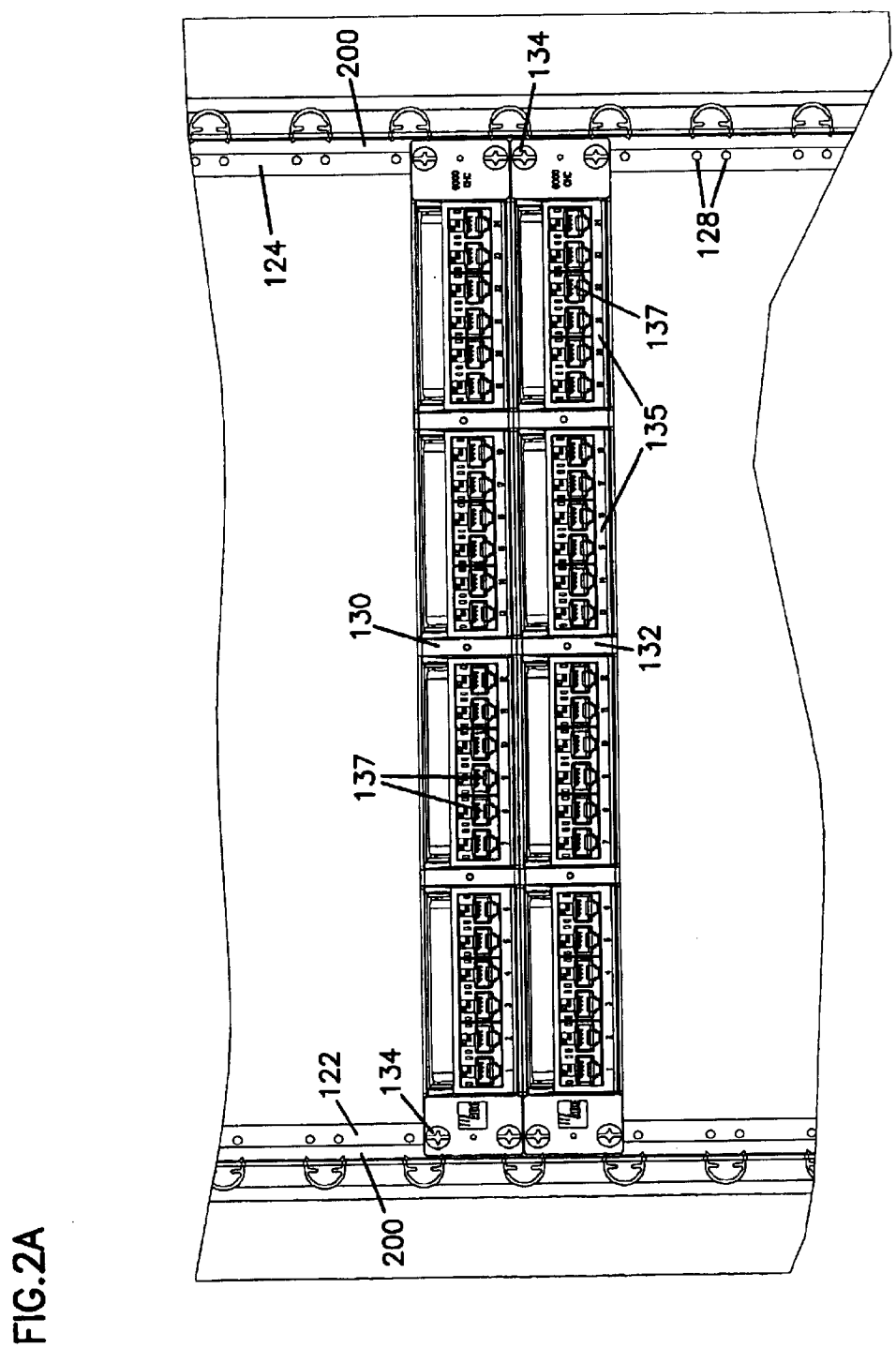
FIG. 2A is a detailed view of a portion of the assembly of FIG. 2.
Figure 3:
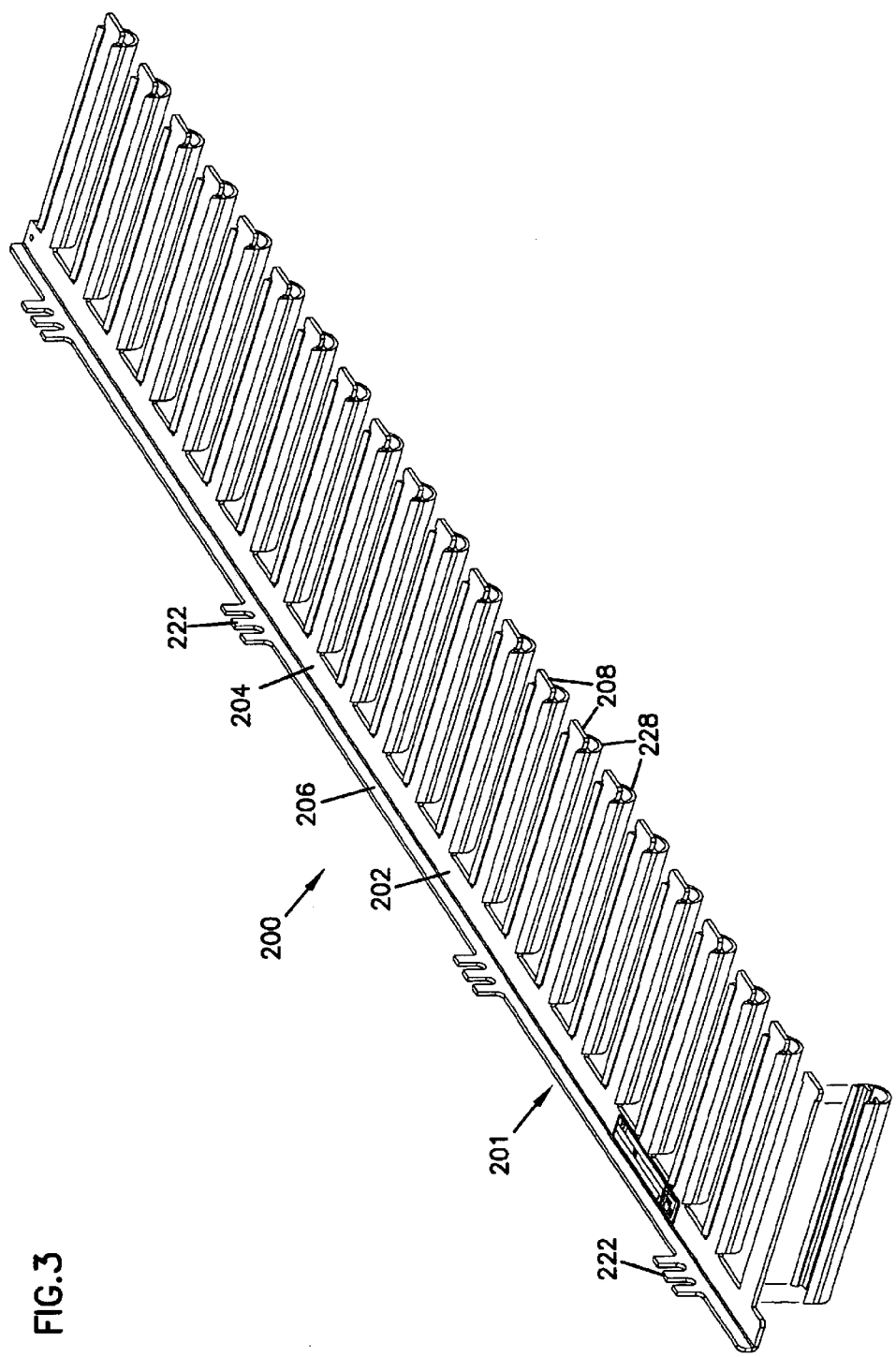
FIG. 3 is a perspective view of a first embodiment of a cable management bracket constructed in accordance with the principles of the present invention, radius limiters are shown mounted on the bracket.

Cabinet assembly 100 also includes vertical support members 122 and 124 (best seen in detail FIGS. 1A and 2A). The vertical support members 122 and 124 are mounted to the cabinet frame 100 at locations recessed from a front 126 of the cabinet frame 110. The vertical support members 122 and 124 define a series of fastener holes. The fastener holes 128 in support member 122 correspond to fastener holes in support member 124 to define panel mounting locations. The panel mounting locations allow various types of telecommunications equipment such as the patch panels 130 and 132 with connector modules 135 to be mounted to the cabinet assembly 100 by fasteners 134. Modules 135 include connector jacks 137, such as twisted pair connector jacks. Other jacks or adapters for copper or fiber cables can be used. Patch panels 130 and 132 are more fully described in PCT Publication WO 99/63628, published Dec. 9, 1999 to the assignee of the present invention, ADC Telecommunications, Inc., the disclosure of which is hereby incorporated by reference.

Each of the illustrated patch panels 130 and 132 can receive up to 24 cables. As additional telecommunications panels are added to the cabinet assembly 100, multiple hundreds of cables can be routed to the cabinet. With so many cables entering the cabinet, proper cable management is essential to prevent the cables from generating an inefficient "spaghetti" of cables. For this reason, cabinet assembly 100 includes four cable management structures or brackets 200.

FIGS. 3–7 show a cable management bracket 200 constructed in accordance with the principles of the present invention. Bracket 200 is adapted for managing cables connected to a piece of telecommunications equipment such as patch panels 130 and 132. The cable management bracket 200 is preferably constructed of a material such as bent sheet-metal. The bracket 200 includes an elongated member or bar 202. The bar includes first and second legs 204 and 206 preferably aligned generally at right angles relative to one another. A plurality of cable management fingers 208 project outwardly from the first leg 204 of the bar 202. The fingers 208 and the first leg 204 are generally coplanar.

The fingers 208 are generally parallel to one another and are spaced apart along the length of the bar 202. Gaps 210 for receiving cables are defined between the fingers 208. The gaps 210 are preferably sized for receiving a plurality of telecommunications cables. The gaps 210 have widths between about 1 and 2 inches.

The second leg 206 of the bar 202 preferably includes structure for allowing the bracket 200 to be connected to the vertical support members 122 and 124 of the cabinet assembly 100. For example the second leg 206 defines open-ended or "slotted" mounting tabs 222 sized to receive a fastener.

The cable management structure 200 is shown including a plurality of bend radius limiters 228. The radius limiters 228 are connected to the fingers 208. The phrase "connected to" includes direct connections, integral connections, and indirect connections provided by one or more intermediate members. Lateral knobs or projections 229 (see FIG. 7) located adjacent the ends of the fingers 208 prevent the radius limiters 228 from inadvertently sliding off the fingers 208. The knobs 229 project outwardly from the sides of the fingers 208 and are depicted as being co-planar with the fingers 208.

The bend radius limiters 228 are preferably made of a resilient material and are preferably snap-fit on the fingers 208. In the figures, the radius limiters 228 are mounted from the side of bracket 200. This type of configuration is adapted to be mounted along side a panel of telecommunications equipment for which cable management is desired (see FIGS. 1 and 2).

Each of the radius limiters 228 includes opposing legs 230 interconnected by a curved (e.g., semi-circular) portion 232. The curved portion 232 includes a convex outer surface that can be defined by a radius equal to or greater than the minimum recommended bend radius for the cable desired to be managed. For some embodiments, the radius can be smaller than the manufacture's recommended bend radius requirements for the cable being managed, but large enough to prevent kinking and to provide a smooth curved transition from horizontal to vertical.

Figure 7:
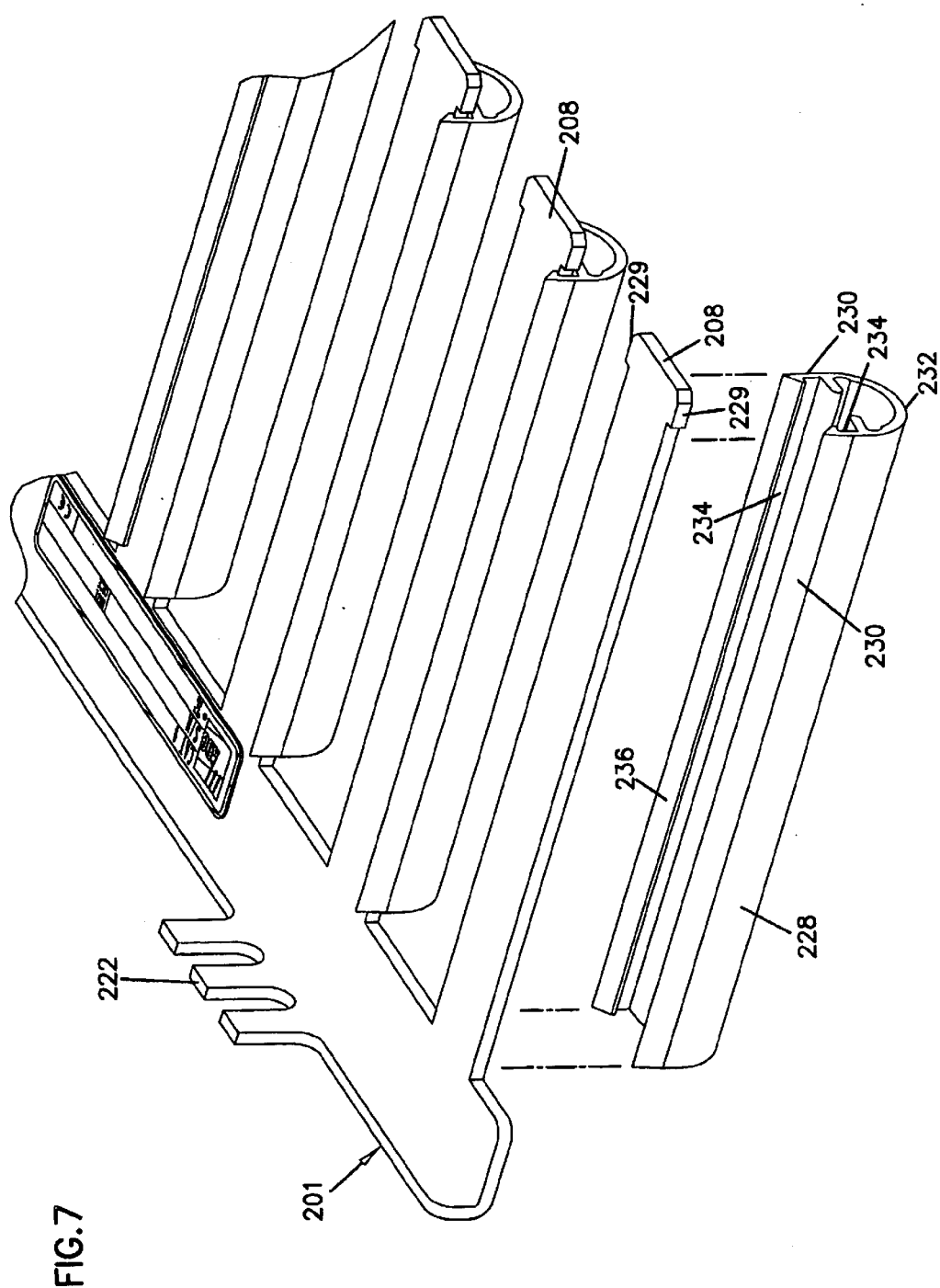
FIG. 7 is a perspective view of a portion of the bracket of FIG. 3 with one radius limiter removed.

Referring still to FIG. 7, the legs 230 of the radius limiters 228 define opposing channels 234 sided to receive the side edges of the fingers 208. Ramps 236 are positioned adjacent the channels 234. To mount one of the radius limiters 228 on its corresponding finger 208, the open end of the radius limiter is pressed against the finger 208. As the limiter 228 is pressed against the finger 208, the ramps 236 cause the legs 230 to flex apart thereby allowing the edges of the finger 208 to snap within the channels 234. To remove the radius limiter 228 from the finger 208, the legs 230 are spread apart to free the edges of the finger 208 from the channels 234. The radius limiter 228 is then pulled from the finger 208. Alternatively, bracket 200 and limiter 228 can be integrally constructed, such as from molded plastic.

Figure 8:
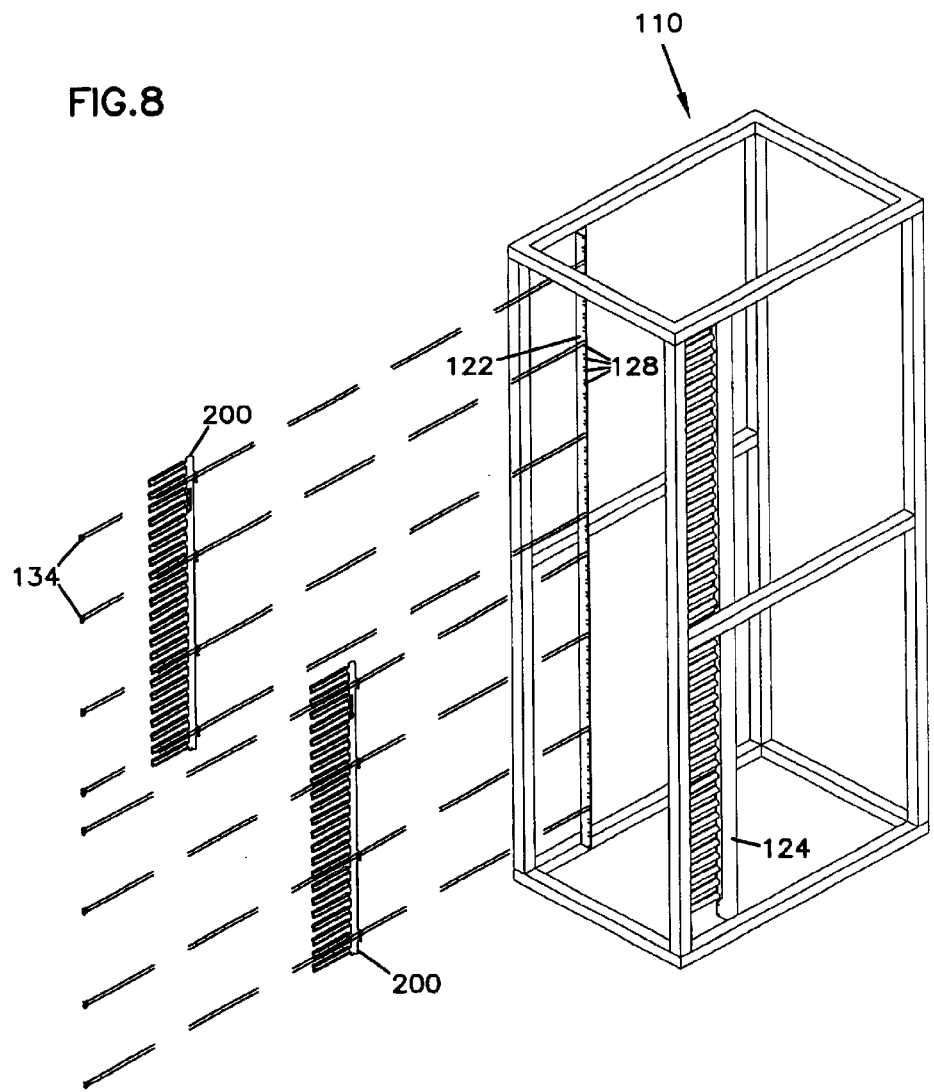
FIG. 8 is an assembly view of a cable management cabinet assembly constructed according to the present invention with side walls removed to show the brackets mounted inside the cabinet.
Figure 9:
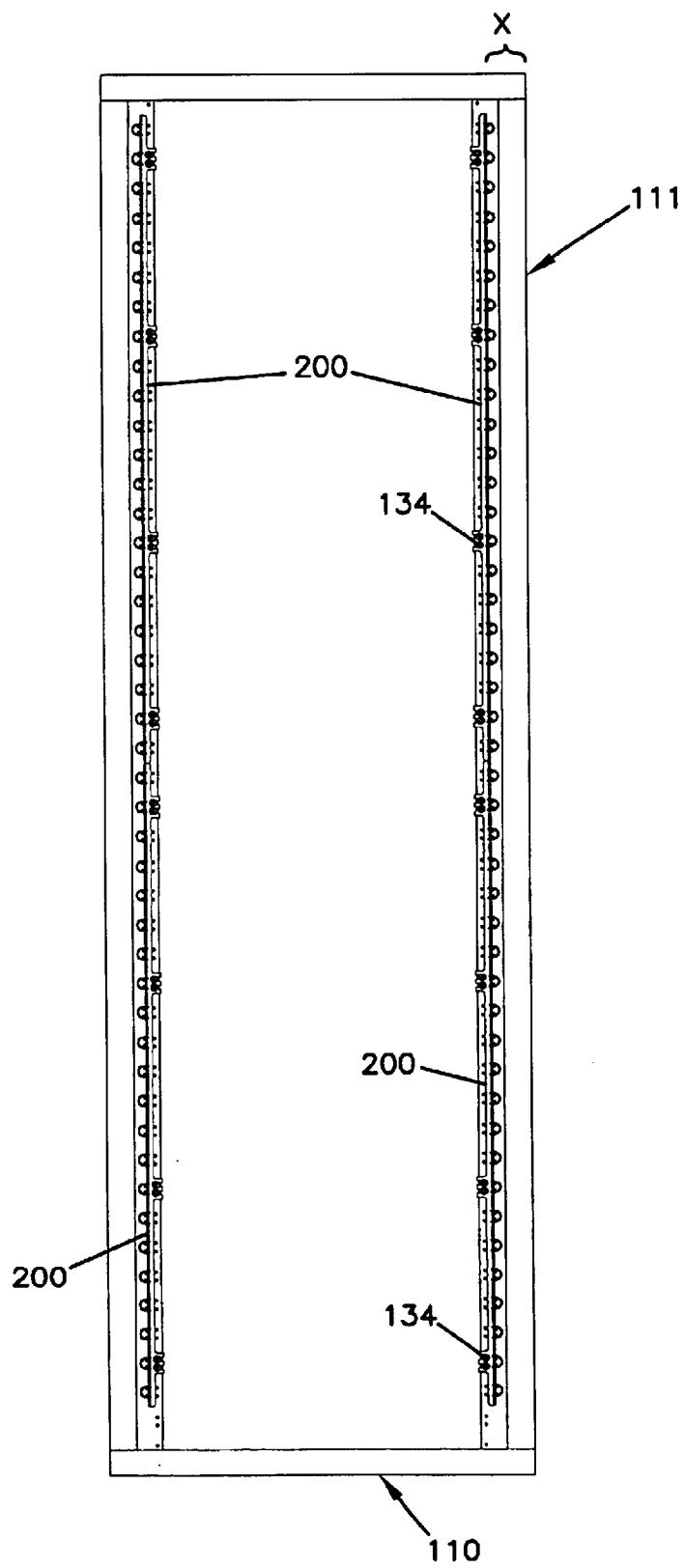
FIG. 9 is a front view of a cable management cabinet assembly having brackets mounted thereto in accordance with the principles of the present invention.
Figure 10:
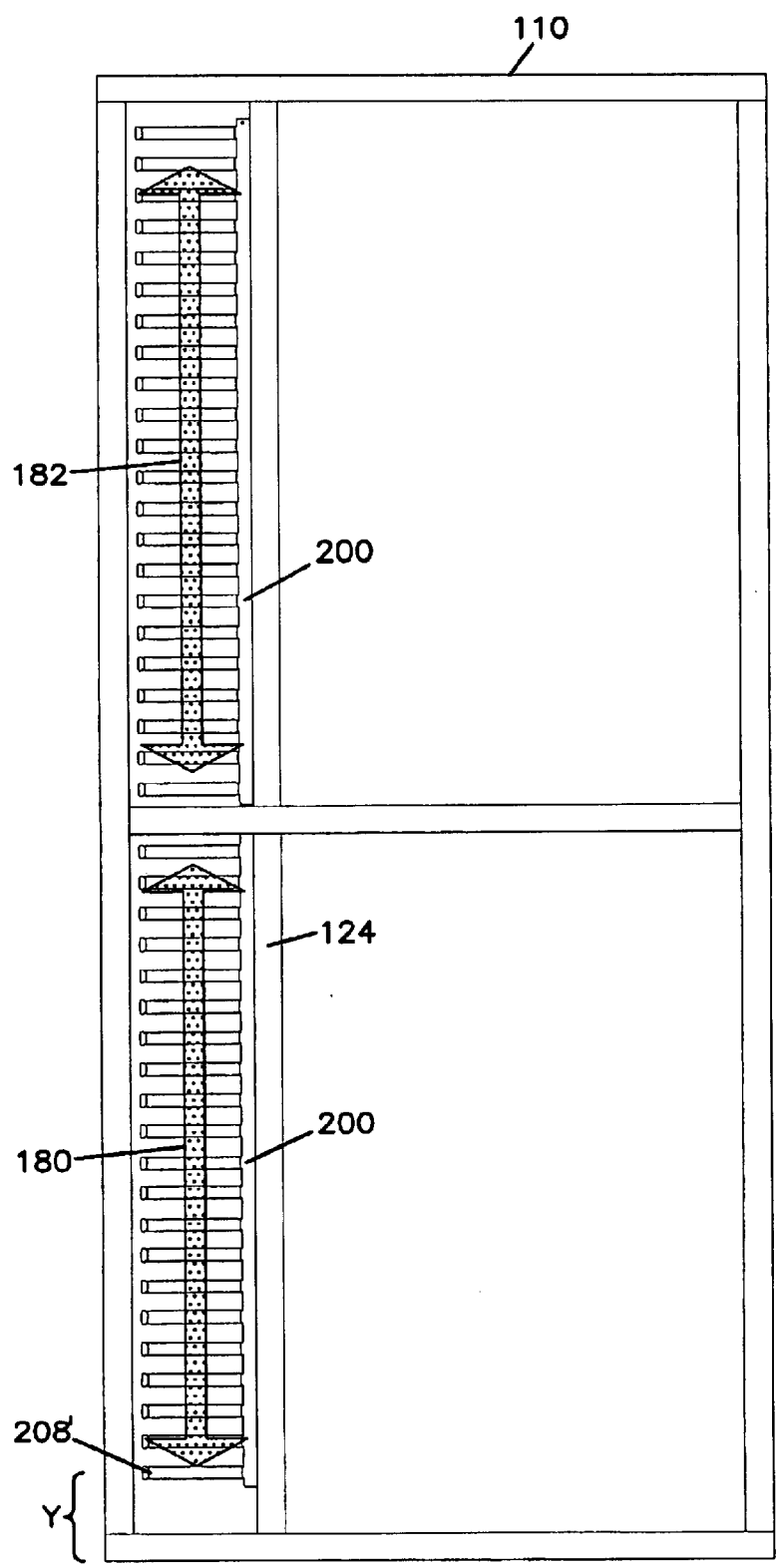
FIG. 10 is a side view of the cabinet of FIG. 9 with side walls removed to show the cable management brackets.
Figure 11:
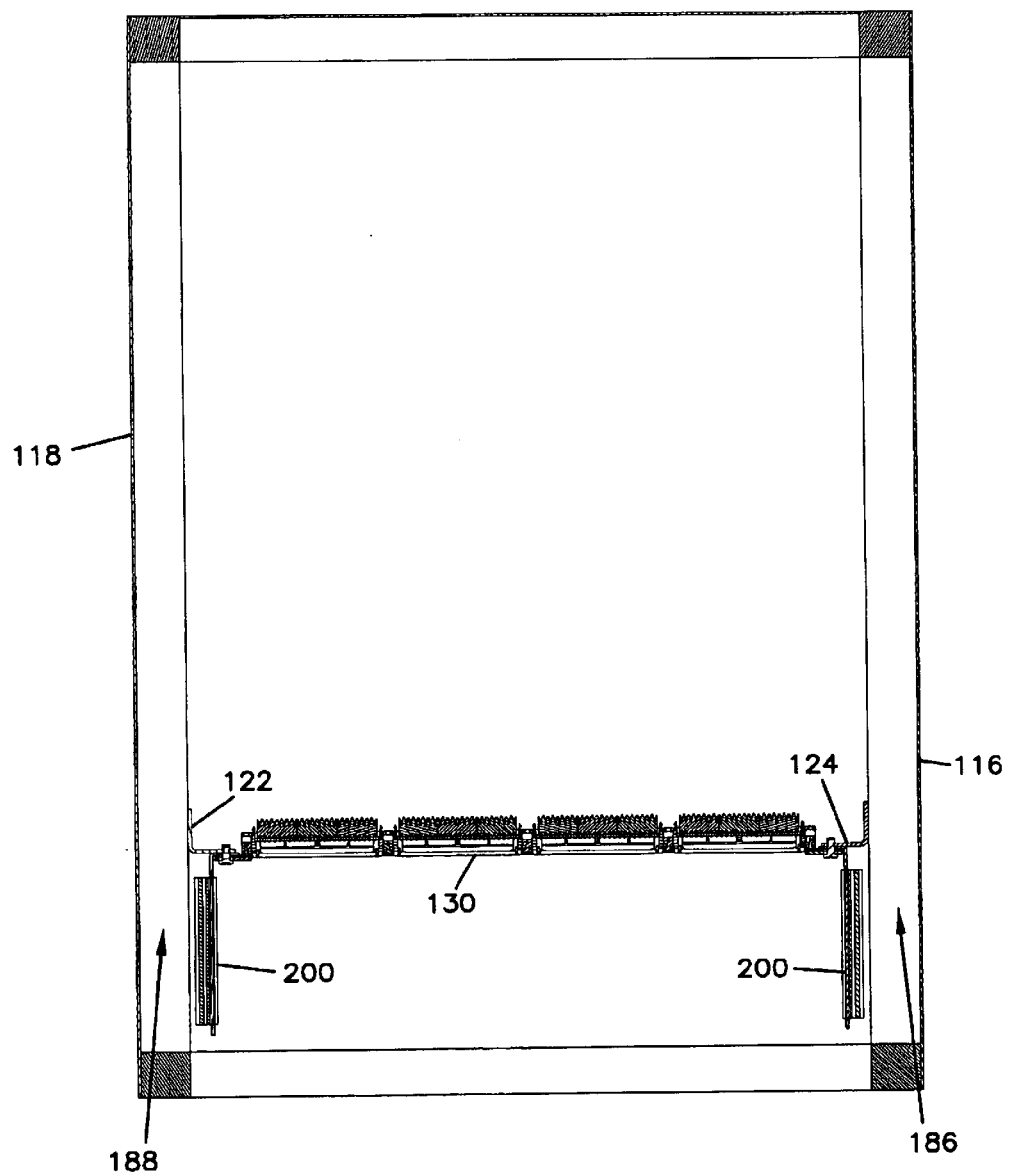
FIG. 11 is a cross sectional view of the assembly in FIG. 2 along line A—A.

FIG. 8 shows how cable management brackets 200 can be mounted to the cabinet frame 110 via vertical support members 122 and 124. Fasteners 134 pass through the slotted tabs 222 of the brackets 200 into fastener holes 128 defined by the support members 122 and 124. FIG. 9 shows a front view of the cabinet frame 110 with the brackets 200 mounted with fasteners 134. The fingers 208 with radius limiters 228 are spaced inwardly from the outside edge 111 of the frame 110 where side wall 116 would be coupled to the frame 110. This spacing shown as distance "x" creates a cable pathway 186 (shown in FIG. 11) between the side wall 116 and the brackets 200 for organizing cables running from the telecommunications panels mounted in the cabinet. Arrows 180 and 182 in FIG. 10 indicate the vertical pathways defined by the cable management brackets. With the cable management brackets mounted to the cabinet, cables can be run horizontally from the panels and then transitioned to the vertical direction by the fingers of the brackets. Once transitioned to a vertical direction the cables are directed through the cable pathways between the brackets 200 and the side walls. Cables may pass to other panels within the same cabinet or may exit the cabinet through the top of cabinet, for example, into a suspended cable trough system, or through the bottom of the cabinet, for example, in a raised floor environment. FIG. 11 shows the separation between the brackets 200 and the side walls 116 and 118 creating cable pathways 186 and 188 along the sides of the cabinet.

The brackets 200 can be constructed and mounted to terminate before reaching the bottom or top of the cabinet. As shown in FIG. 10, bottom-most finger 208' is a distance "y" above the bottom of the cabinet frame 110. This creates an exit gap for cables to exit the cable pathway at the bottom of the cabinet.

Figure 11A:
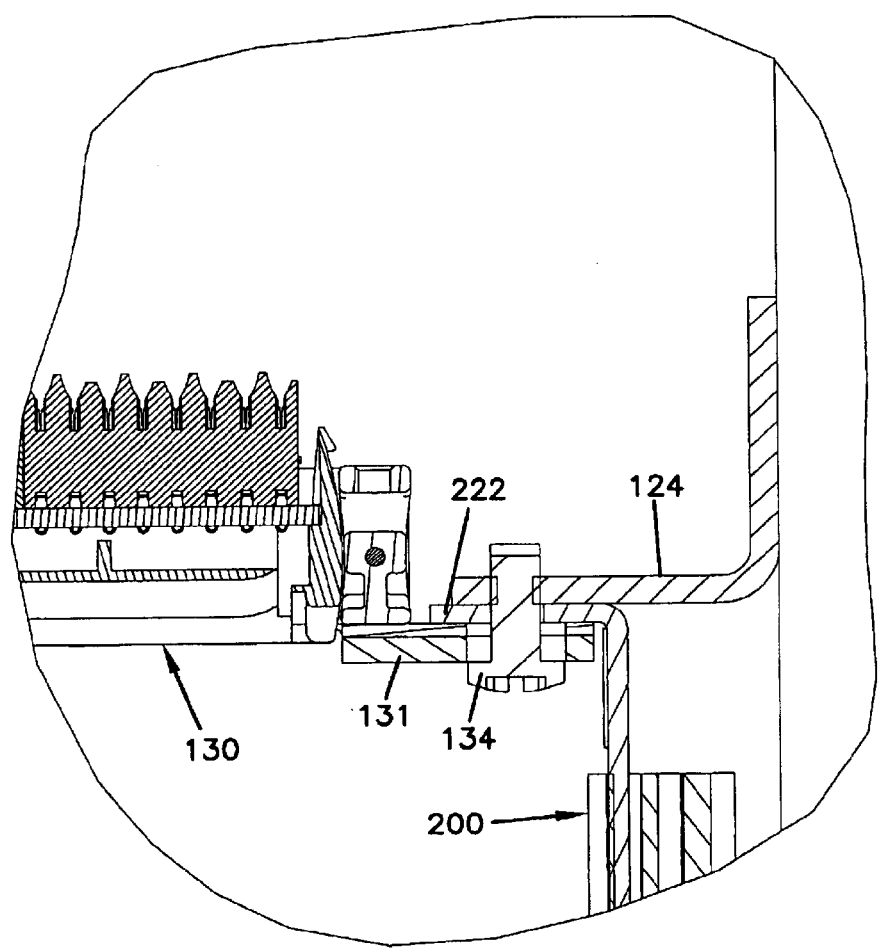
FIG. 11A is a detailed view of a portion of FIG. 11.
Figure 12:
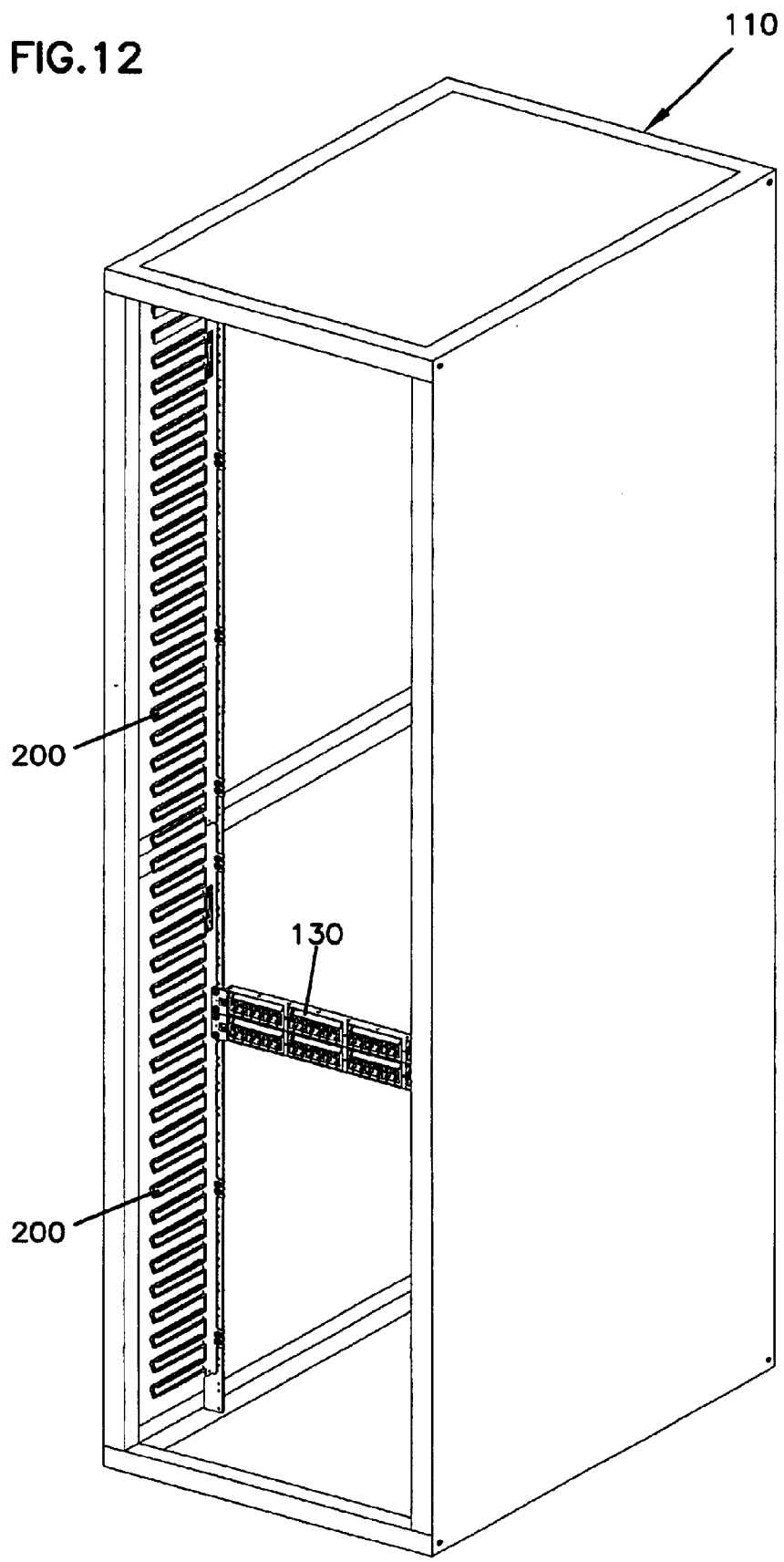
FIG. 12 is a front perspective view of a second cable management cabinet assembly according to the present invention.
Figure 12A:
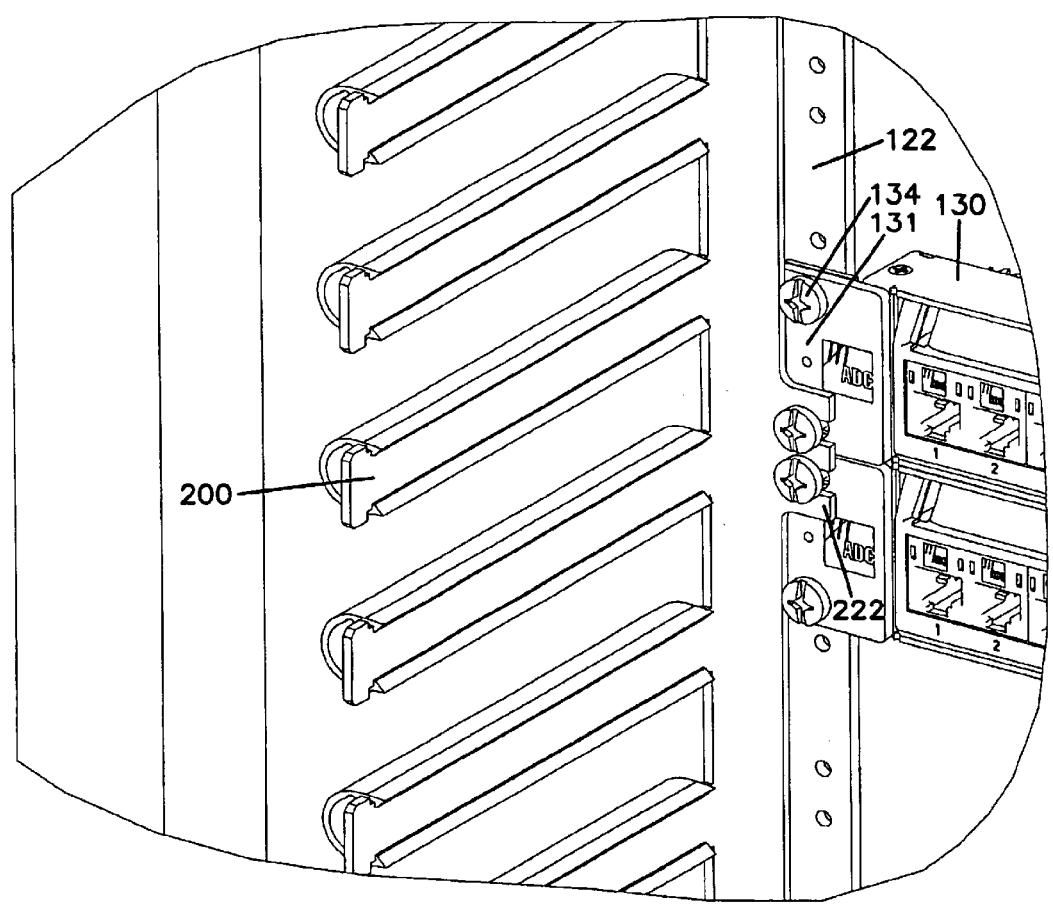
FIG. 12A is a detailed view of a portion of the cable management cabinet assembly shown in FIG. 12.
Figure 13:
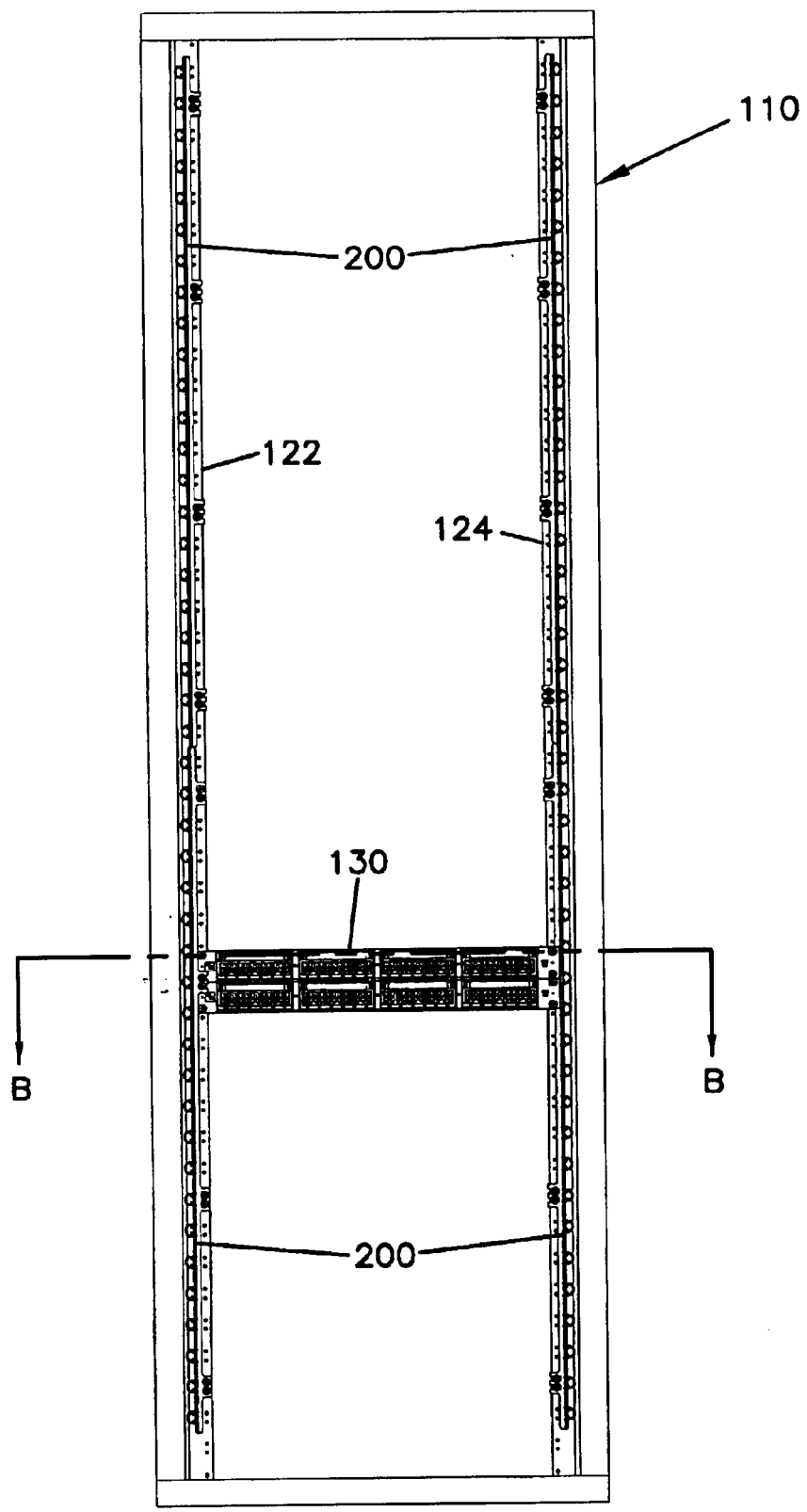
FIG. 13 is a front view of the cable management cabinet assembly of FIG. 12.
Figure 13A:
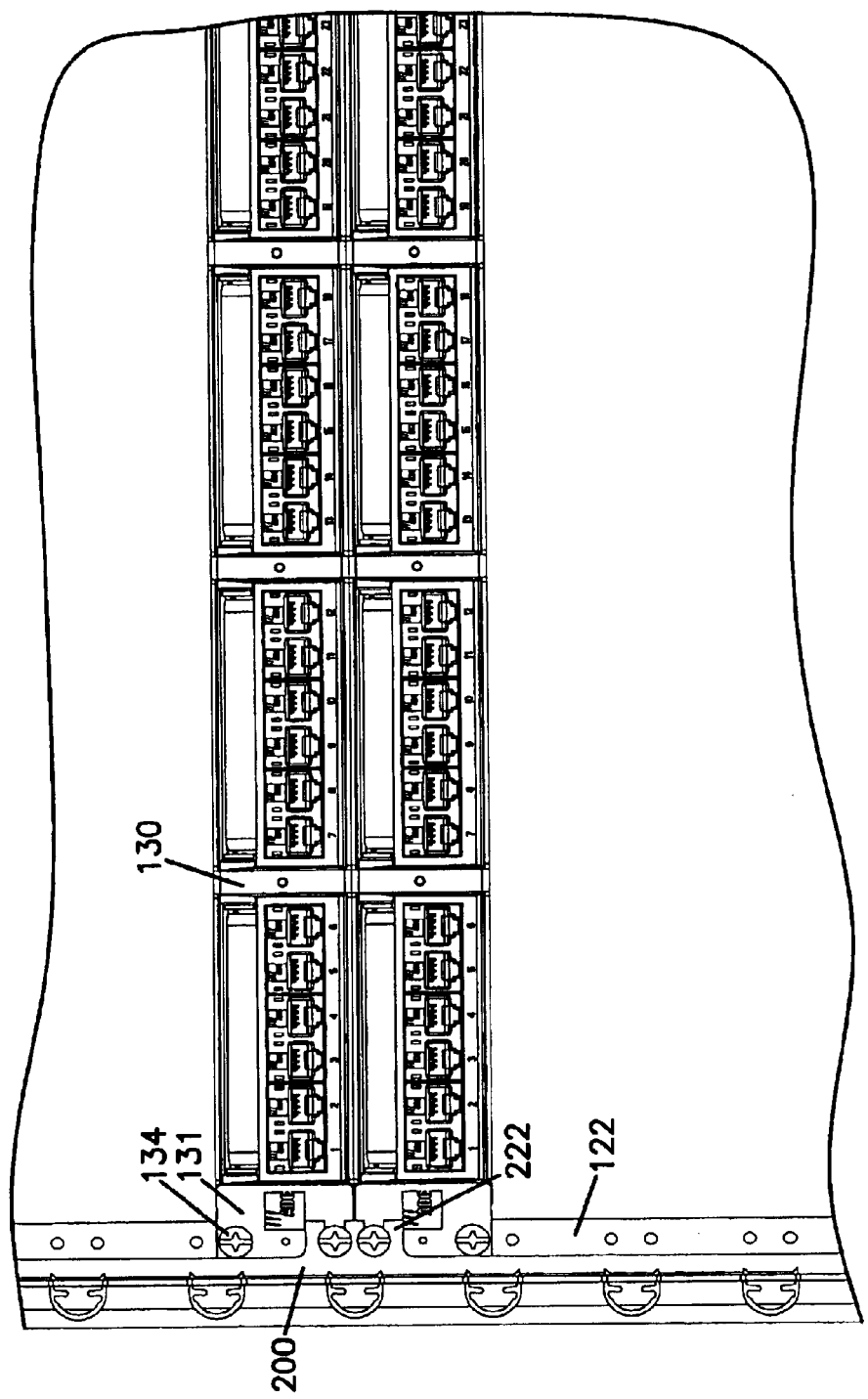
FIG. 13A is a detailed view of a portion of the assembly of FIG. 13.
Figure 14:
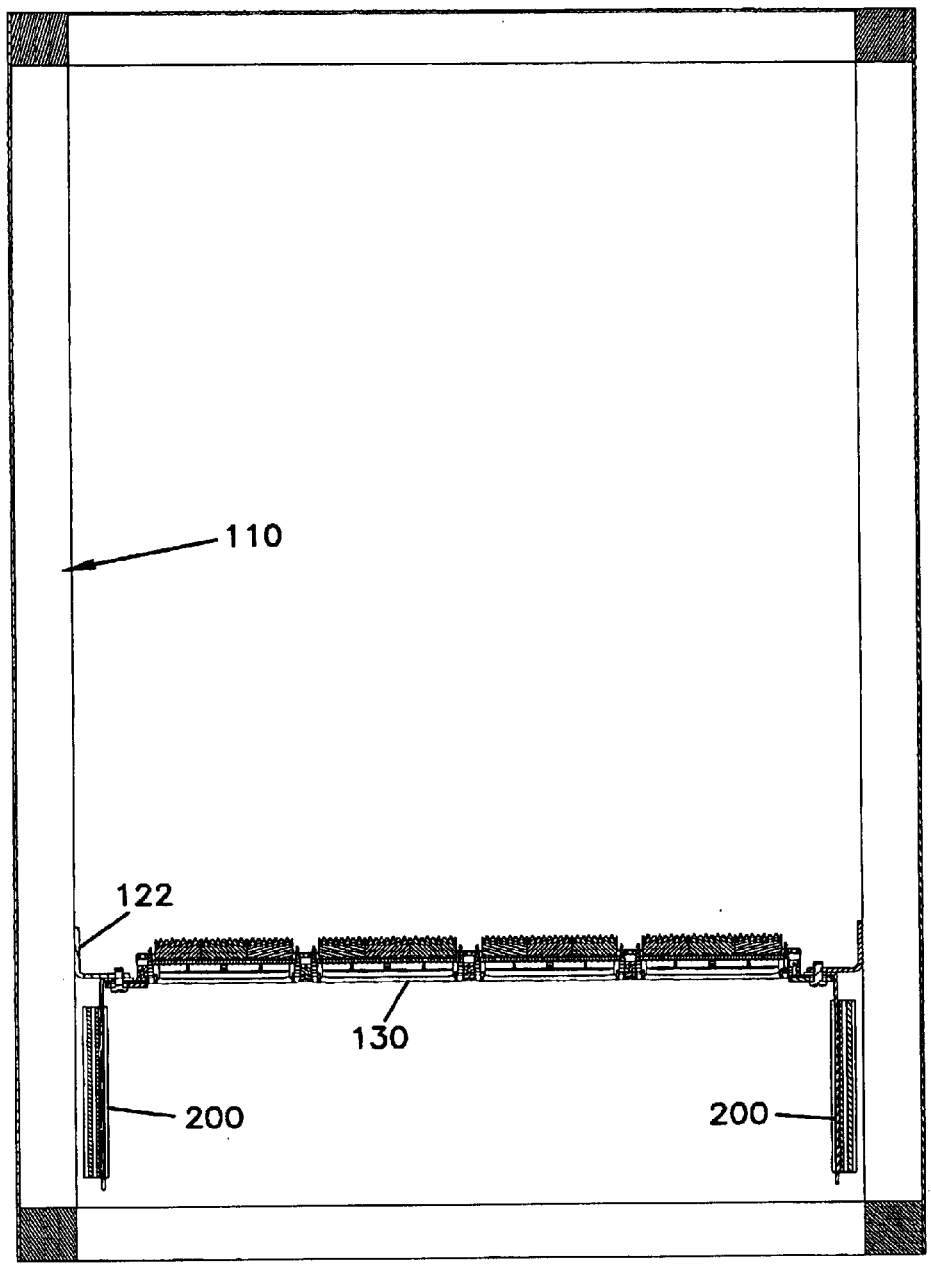
FIG. 14 is a cross sectional view of the assembly in FIG. 13 along line B—B.
Figure 14A:
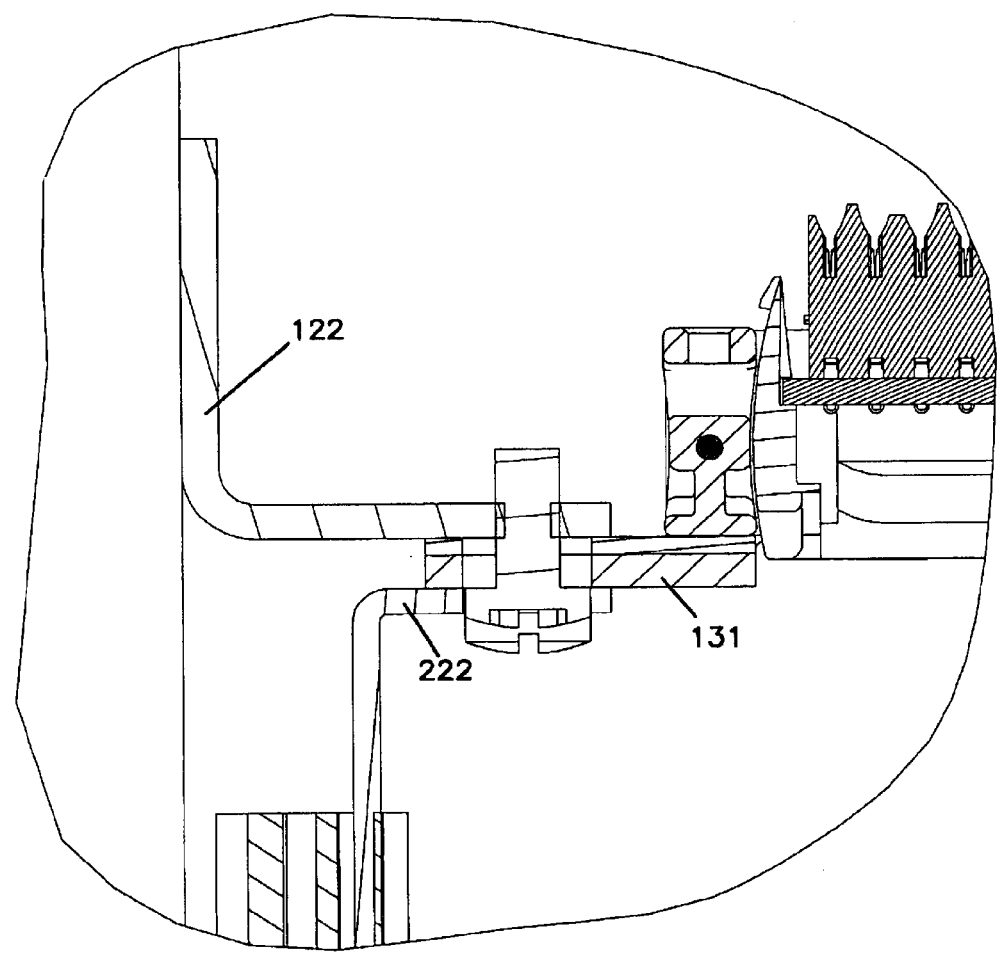
FIG. 14A is a detailed view of a portion of FIG. 14.
Figure 15:
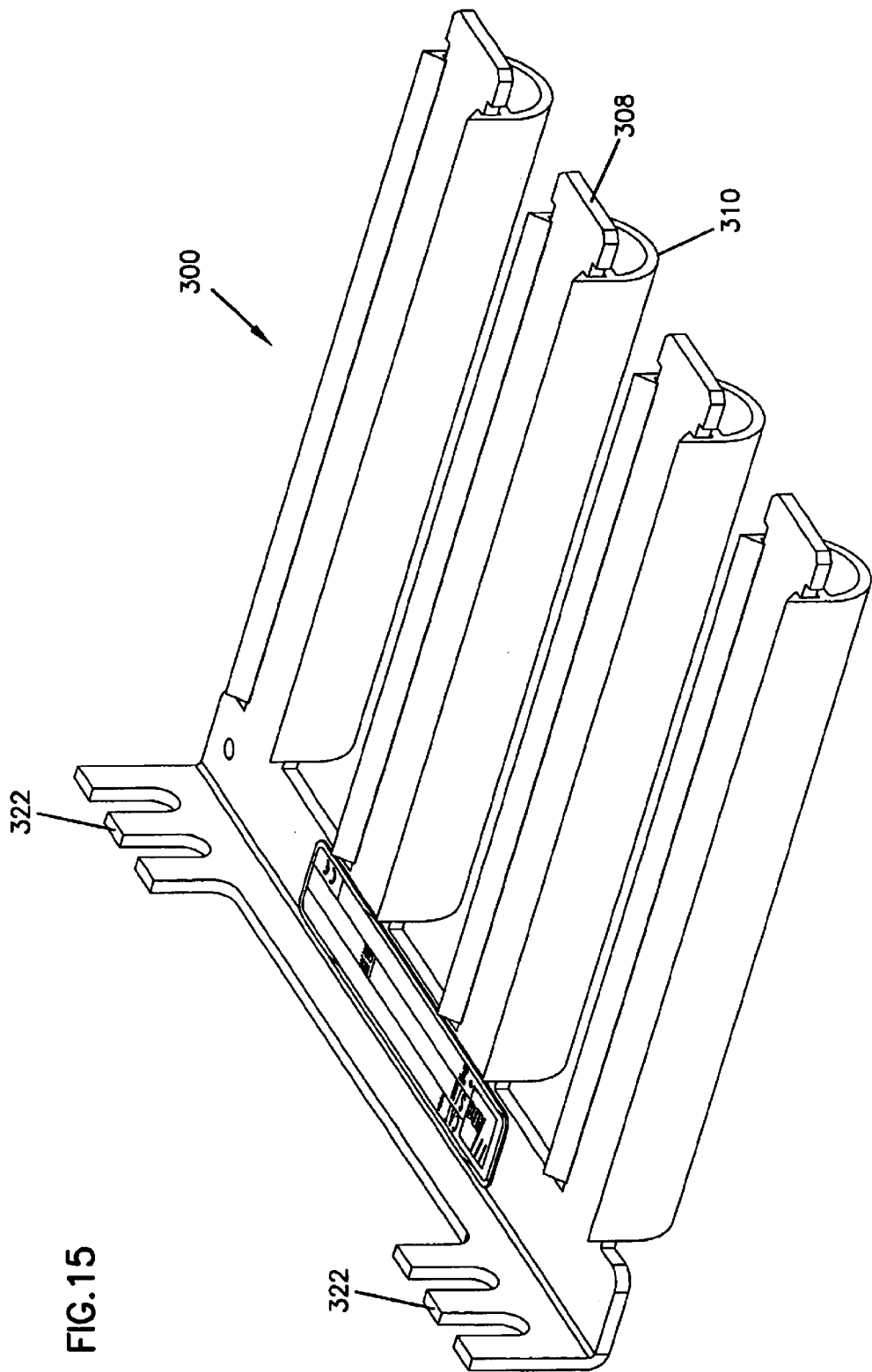
FIG. 15 is a perspective view of a second embodiment of a cable management bracket constructed in accordance with the principles of the present invention, radius limiters are shown mounted on the bracket.

Preferably brackets 200 are mounted to the vertical support members 122 and 124, and then panel 130 is mounted on top of the brackets as shown in the detailed view in FIG. 11A. In this arrangement, slotted tabs 222 of the bracket 200 are between the vertical support member 124 and mounting plate 131 of patch panel 130. This allows the patch panels to be easily removed and new or different panels to be added without removing the brackets 200.

If a panel is desired to be added to cabinet assembly 100, and a fastener 134 is prepositioned in hole 128 and slotted tab 222, fastener 134 can be removed completely, leaving the other fasteners 134 holding bracket 200 to vertical support 124. Then fastener 134 can be replaced, first passing through mounting plate 131, then through slotted tab 222 and into hole 128.

In use of the system, cables are routed horizontally from the telecommunications equipment panel such as panel 130 to the cable management bracket 200. At the cable management bracket 200, the cables are routed through the gaps 210 defined between the fingers 208 of the bracket 200. The cables are positioned around the radius limiters 228 to smoothly transition the cables from a generally horizontal orientation to a generally vertical orientation. After being positioned around the radius limiters 228, the cables are routed generally vertically up or down the vertical cable pathway 180 or 182 between the fingers 208 and the side panel 116 of the cabinet. The cables may then exit the cabinet from the bottom or top of the cabinet by means of other cable management equipment such as by suspended cable management troughs.

Alternatively, the brackets 200 may be mounted to a cabinet already having panels mounted thereto without removing the panels. This alternative configuration is shown in FIGS. 12, 12A, 13, 13A, 14, and 14A. In this arrangement, the mounting plate 131 of patch panel 130 is positioned beneath the slotted tab 222 of bracket 200.

For some applications, the open-ended shape of the slotted tabs 222 allows the bracket 200 to be mounted to a cabinet with the same fasteners used to mount a corresponding piece of telecommunications equipment to the cabinet, for example, the patch panels 130 and 132. Since the patch panels 130 and 132 are front access (i.e., the connectors face forwardly), cable management would be preferred at the front of the cabinet. To mount the bracket 200 at the front of the cabinet, the fasteners used to secure the panels 130 and 132 to the support members 122 and 124 are loosened. Once the fasteners are loose, the bracket 200 can be laterally slid into place with the fasteners received within the slotted tabs 222. The fasteners are then re-tightened to hold the bracket 200 and panels 130 and 132 in place. In this manner, the bracket 200 can be mounted without requiring the fasteners to be completely removed from the cabinet.

Alternatively, as may be desired for rear access panels, the brackets 200 may be mounted to rear facings of the panels instead of or in addition to the front mounted brackets.

Figure 16:
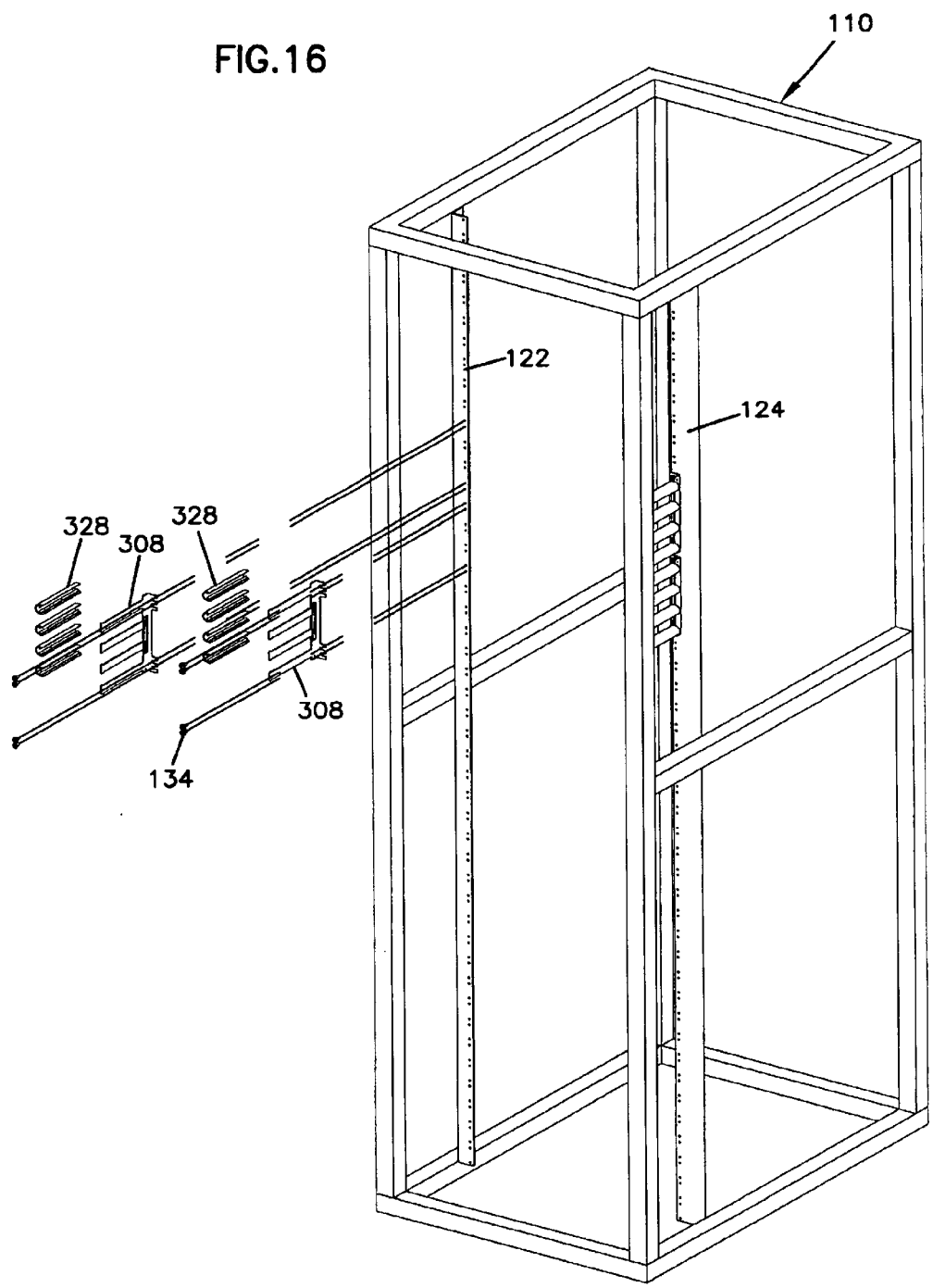
FIG. 16 is an assembly view of a cable management cabinet assembly constructed according to the present invention using the cable management brackets of FIG. 15. The side walls of the cabinet have been removed to show the brackets mounted inside the cabinet.
Figure 17:
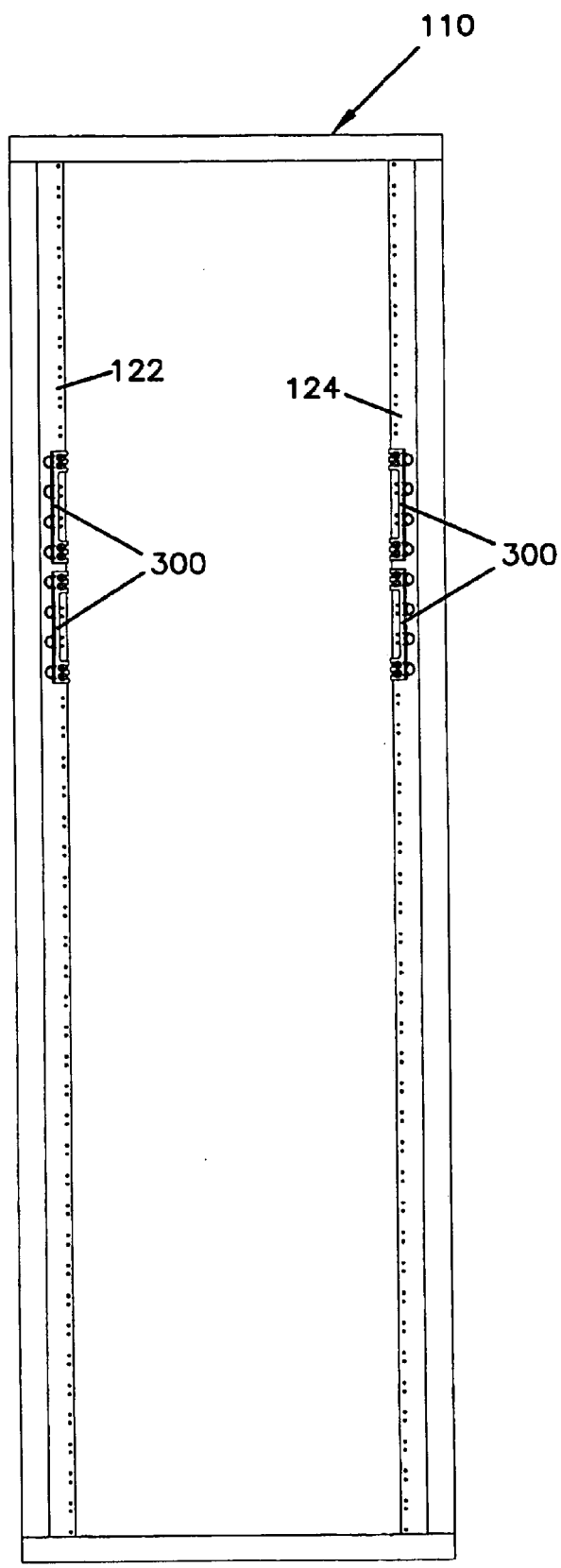
FIG. 17 is a front view of a cable management cabinet assembly having the brackets of FIG. 15 mounted thereto in accordance with the principles of the present invention.

Cable management brackets according to the present invention may be made in different lengths. For example, FIGS. 15–18 show a smaller cable management bracket 300 having only four fingers 308. The smaller cable management bracket 300 includes radius limiters 310 and slotted mounting tabs 322. The smaller brackets 300 allow for greater flexibility in arranging the cable management within the cabinet. As desired, brackets 300 may be placed adjacent some panels but not others, creating shorter cable pathways indicated by arrow 330 in FIG. 18. As shown in FIG. 16, brackets 300 may be fastened to the vertical support members 122 and 124 of the cabinet in the same manner as the larger brackets 200 via fasteners 134.

While patch panels 130 and 132 are shown in the illustrated embodiments, other panels or other equipment, such as rear access equipment, can be used with or instead of panels 130 and 132. Further, other cable management devices may be used in combination with the brackets of the present invention. For example, cable support bars or tie-down bars can be mounted to the rear of patch panel 130 to manage the cables leading into the rear of the patch panel.

With regard to the foregoing description, it is to be understood that changes may be made in detail without departing from the scope of the present invention. It is intended that the specification and depicted aspects of the invention may be considered exemplary, only, with a true scope and spirit of the invention being indicated by the broad meaning of the following claims.

We claim:

1. A cable management cabinet assembly including:
   a cabinet frame including vertical and horizontal support beams, the cabinet frame having a front, back, top and opposed sides;
   first and second side walls fastened to the opposed sides of the cabinet frame to define a frame interior;
   first and second vertical support members, the vertical support members coupled to the cabinet frame at points recessed from the front of the cabinet frame, the vertical support members defining a plurality of fastener holes, the fastener holes in the first support member acting with the fastener holes of the second support member to define panel mounting locations;

a bracket including an elongated member, the bracket fastened to one of the first and second vertical support members, the bracket having a plurality of fingers that project outwardly from the elongated member parallel to the sides of the cabinet frame but not extending beyond the front or back of the cabinet frame, the fingers being spaced apart along a length of the elongated member in the vertical direction, the fingers defining gaps between the fingers, the gaps being sized to receive telecommunications cables, the fingers being spaced from the sides of the cabinet frame to create a vertical cable pathway between the fingers and one of the first and second side walls; and the fingers including bend radius limiter portions, the radius limiter portions having a curved surface oriented toward the outside of the cabinet.

2. The cabinet assembly of claim 1 wherein the bracket is a first bracket and the cable pathway is a first cable pathway, the cabinet assembly further comprising a second bracket fastened to the other of the first and second vertical support members opposite the first bracket, the second bracket having a plurality of fingers that project outwardly from the elongated member parallel to the sides of the cabinet frame but not extending beyond the front or back of the cabinet frame, the fingers being spaced apart along a length of the elongated member in the vertical direction, the fingers defining gaps between the fingers, the gaps being sized to receive telecommunications cables, the fingers being spaced from the sides of the cabinet frame to create a second vertical cable pathway between the fingers and the cabinet frame.

3. The cabinet assembly of claim 1, wherein the bracket includes a plurality of slotted mounting tabs, the mounting tabs extending from the elongated member in a direction perpendicular to the fingers.

4. The cabinet assembly of claim 2 further comprising telecommunications equipment disposed between the first and second brackets, and coupled by fasteners to a connection location defined by the vertical support members.

5. The cabinet assembly of claim 4 wherein the first and second brackets are coupled to the vertical support members by the same fasteners that couple the telecommunications equipment to the vertical support members.

6. The cabinet assembly of claim 1 wherein the fingers extend from the elongated member toward the front of the cabinet frame.

7. The cabinet assembly of claim 1 wherein the elongated member is "L" shaped.

8. A method of assembling a telecommunications cabinet, the method comprising the steps of:

providing a cabinet having a panel of telecommunications equipment mounted to recessed vertical support members within the cabinet, the cabinet including a cabinet frame and side walls fastened to the frame;

loosening fasteners which mount the panel to the cabinet;

sliding a bracket having slotted mounting tabs beneath the loosened fasteners, the bracket also including an elongated member from which the slotted mounting tabs extend and a plurality of fingers that project outwardly from the elongated member parallel to the side walls of the cabinet but not extending beyond a front or back of the cabinet frame, the fingers being spaced apart along a length of the elongated member in the vertical direction, the fingers defining gaps between the fingers, the gaps being sized to receive telecommunications cables, the fingers being spaced from the side walls of the cabinet to create a vertical cable pathway between the fingers and one of the side walls; and tightening the fasteners to mount the bracket to the cabinet so that a surface of the equipment panel is between the bracket and the support member.

* * * * *